US007195806B2

(12) United States Patent
DeKunder et al.

(10) Patent No.: US 7,195,806 B2
(45) Date of Patent: Mar. 27, 2007

(54) HIGH GLOSS POLYETHYLENE ARTICLES

(75) Inventors: Gregory S. DeKunder, Pearland, TX (US); Eric Maziers, Seneffe (BE); Brian B. Cole, Kingwood, TX (US); G. Travis Meredith, Pearland, TX (US); Gerhard Guenther, Seabrook, TX (US); Walter T. Jagmin, Kingwood, TX (US)

(73) Assignee: Fina Technology, Inc., Houston, TX (US)

( * ) Notice: Subject to any disclaimer, the term of this patent is extended or adjusted under 35 U.S.C. 154(b) by 363 days.

(21) Appl. No.: 10/761,181

(22) Filed: Jan. 20, 2004

(65) Prior Publication Data
US 2004/0236025 A1 Nov. 25, 2004

Related U.S. Application Data

(60) Provisional application No. 60/441,137, filed on Jan. 17, 2003.

(51) Int. Cl.
*B65D 1/00* (2006.01)
*C08F 10/02* (2006.01)

(52) U.S. Cl. ................. 428/35.7; 526/348.2; 526/352; 428/35.2

(58) Field of Classification Search ................ 526/352, 526/348.2; 428/35.7, 35.2
See application file for complete search history.

(56) References Cited

U.S. PATENT DOCUMENTS

| 4,530,914 A | 7/1985 | Ewen et al. ................ 502/113 |
| 4,542,199 A | 9/1985 | Kaminsky et al. .......... 526/160 |
| 4,665,208 A | 5/1987 | Welborn, Jr. et al. ....... 556/179 |
| 4,769,910 A | 9/1988 | Noon .......................... 30/91.2 |
| 4,794,096 A | 12/1988 | Ewen ........................ 502/117 |
| 4,808,561 A | 2/1989 | Welborn, Jr. ................ 502/104 |
| 4,871,705 A | 10/1989 | Hoel .......................... 502/117 |
| 4,874,734 A | 10/1989 | Kioka et al. ............... 502/104 |
| 4,908,465 A | 3/1990 | Dingwall et al. ........... 558/175 |
| 4,924,018 A | 5/1990 | Bottelberghe ............... 556/179 |
| 4,931,417 A | 6/1990 | Miya et al. ................. 502/117 |
| 4,933,403 A | 6/1990 | Kaminsky et al. .......... 526/160 |
| 4,937,299 A | 6/1990 | Ewen et al. ................ 526/119 |
| 4,952,540 A | 8/1990 | Kioka et al. .................... 502/9 |
| 4,968,827 A | 11/1990 | Davis ......................... 556/179 |
| 4,975,403 A | 12/1990 | Ewen ......................... 502/113 |
| 5,017,714 A | 5/1991 | Welborn, Jr. ................. 556/12 |
| 5,026,798 A | 6/1991 | Canich ....................... 526/127 |
| 5,057,475 A | 10/1991 | Canich et al. .............. 502/104 |
| 5,091,352 A | 2/1992 | Kioka et al. ............... 502/103 |
| 5,103,031 A | 4/1992 | Smith, Jr. ................... 556/179 |
| 5,120,867 A | 6/1992 | Welborn, Jr. ................. 556/12 |
| 5,132,381 A | 7/1992 | Winter et al. ............... 526/160 |
| 5,145,819 A | 9/1992 | Winter et al. ............... 502/117 |
| 5,155,180 A | 10/1992 | Takada et al. .............. 525/440 |
| 5,198,401 A | 3/1993 | Turner et al. ............... 502/155 |
| 5,204,419 A | 4/1993 | Tsutsui et al. .............. 526/153 |
| 5,206,199 A | 4/1993 | Kioka et al. ................ 502/117 |
| 5,235,081 A | 8/1993 | Sangokoya .................. 556/179 |
| 5,239,022 A | 8/1993 | Winter et al. ............... 526/127 |
| 5,243,001 A | 9/1993 | Winter et al. ............... 526/127 |
| 5,248,801 A | 9/1993 | Sangokoya .................. 556/179 |
| 5,276,208 A | 1/1994 | Winter et al. ................. 556/53 |
| 5,278,119 A | 1/1994 | Turner et al. ............... 502/155 |
| 5,296,434 A | 3/1994 | Karl et al. .................. 502/117 |
| 5,304,614 A | 4/1994 | Winter et al. ............... 526/127 |
| 5,308,815 A | 5/1994 | Sangokoya .................. 502/104 |
| 5,324,800 A | 6/1994 | Welborn, Jr. et al. ....... 526/160 |
| 5,329,032 A | 7/1994 | Tran et al. .................. 556/179 |
| 5,329,033 A | 7/1994 | Spaleck et al. ............... 556/53 |
| 5,350,723 A | 9/1994 | Neithamer et al. ......... 502/104 |
| 5,374,752 A | 12/1994 | Winter et al. ................. 556/11 |
| 5,391,790 A | 2/1995 | Rohrmann et al. ........... 556/28 |
| 5,436,305 A | 7/1995 | Alt et al. .................... 526/160 |
| 5,510,502 A | 4/1996 | Sugano et al. ................ 556/11 |
| 5,532,396 A | 7/1996 | Winter et al. ................. 556/11 |
| 5,543,373 A | 8/1996 | Winter et al. ............... 502/103 |
| 5,643,847 A | 7/1997 | Walzer, Jr. .................. 502/117 |
| 5,672,668 A | 9/1997 | Winter et al. ............... 526/127 |
| 5,846,896 A | 12/1998 | Ewen ......................... 502/117 |
| 6,087,291 A | 7/2000 | Speca et al. ................ 502/104 |
| 6,100,214 A | 8/2000 | Walzer, Jr. et al. ......... 502/159 |
| 6,114,479 A | 9/2000 | Speca et al. ................ 526/147 |
| 6,117,955 A | 9/2000 | Agapiou et al. ............ 526/141 |
| 6,124,230 A | 9/2000 | Speca et al. ................ 502/111 |
| 6,140,432 A | 10/2000 | Agapiou et al. ............ 526/141 |
| 6,194,341 B1 | 2/2001 | Canich et al. .............. 502/113 |

(Continued)

FOREIGN PATENT DOCUMENTS

EP 0010570 A2 5/1980

(Continued)

*Primary Examiner*—Caixia Lu
(74) *Attorney, Agent, or Firm*—Diane L. Kilpatrick-Lee

(57) ABSTRACT

The present invention includes an end use article (i.e., an article of manufacture) and a process for making the same, wherein the end use article has a relatively high gloss and exhibits excellent processability over a wide range of processing conditions. The end use article can be formed with glossy polyethylene having an "a" parameter less than or equal to about 0.40, and the glossy polyethylene can be a Metallocene polyethylene. The end use article can have a 60° specular gloss of at least about 40%, or from about 40% to about 80%, or from about 60% to about 80%. The end use article may be pigmented or unpigmented.

21 Claims, 1 Drawing Sheet

U.S. PATENT DOCUMENTS

| | | |
|---|---|---|
| 6,228,795 B1 | 5/2001 | Vizzini .................. 502/155 |
| 6,245,706 B1 | 6/2001 | Hlatky .................. 502/152 |
| 6,914,113 B2 * | 7/2005 | McLeod et al. ............ 526/352 |
| 6,960,375 B2 * | 11/2005 | Giblin et al. ............ 428/35.7 |
| 2003/0030174 A1 * | 2/2003 | Gray et al. ............ 264/171.28 |

FOREIGN PATENT DOCUMENTS

| | | |
|---|---|---|
| EP | 0277003 A1 | 8/1988 |
| EP | 0277004 A1 | 8/1988 |
| EP | 0279586 B1 | 8/1988 |
| EP | 0426637 A2 | 5/1991 |
| EP | 0495375 A2 | 7/1992 |
| EP | 0500944 A1 | 9/1992 |
| EP | 0520732 A1 | 12/1992 |
| EP | 0549900 B1 | 7/1993 |
| EP | 0561476 A1 | 9/1993 |
| EP | 0573403 A2 | 12/1993 |
| EP | 0576970 B1 | 1/1994 |
| EP | 0594218 A1 | 4/1994 |
| EP | 0611773 B1 | 8/1994 |
| WO | WO92/00333 | 1/1992 |
| WO | WO94/07928 | 4/1994 |
| WO | WO94/10180 | 5/1994 |
| WO | WO98/22486 | 5/1998 |

* cited by examiner

HIGH GLOSS POLYETHYLENE ARTICLES

CROSS-REFERENCE TO RELATED APPLICATIONS

This application claims priority from U.S. Provisional Patent Application No. 60/441,137 filed on Jan. 17, 2003.

BACKGROUND OF THE INVENTION

1. Field of the Invention

The present invention relates to polyethylene articles, and more particularly to high-gloss polyethylene articles having excellent properties.

2. Background of the Art

The number of consumer products or packaging for consumer products that contain polymers continues to increase everyday. As such, there is a growing need to develop polymers that can be used to form more appealing products for consumers. Industry is concerned with forming end use polymer articles that exhibit a high level of gloss because consumers find the glossy appearance of certain products desirable. For example, it is believed that consumers are more likely to buy a product contained within a glossy plastic bottle because they correlate the glossy bottle with a higher quality product.

Technically speaking, gloss is defined as the ratio of the reflected light from a material to the scattered light at a specific angle of incidence, multiplied by 100 to yield a percentage ("%" is herein understood to mean percent). According to ASTM D2457, specular gloss is the ratio of the flux reflected in specular direction to incident flux for a specified angle of incidence and source and receptor angular apertures. Polypropylene (PP), polyethylene terephthalate (PET), and polyvinyl chloride (PVC) formed according to conventional polymerization methods and fabricated into end use articles by equipment known in the art are considered to exhibit relatively high levels of gloss. Thus, PP, PET, and PVC are well suited for forming end use articles, such as health and beauty product bottles, for which a glossy appearance is desired.

In contrast, polyethylene (PE) produced according to conventional polymerization processes, e.g., using a chromium or Ziegler-Natta catalyst, typically does not achieve a sufficient level of gloss for use in such products. PE can have advantages over PP, PET and PVC due to one or more of the following attributes: recycle ability, toughness, chemical resistance, barrier properties, adaptability to various fabrication techniques and the ability to fine tune physical properties. Furthermore, polyethylene can be processed using common methods, e.g., blow molding or extrusion, whereas PET must be processed using stretchable molding, which requires special equipment. PVC has the additional drawback of environmental concerns.

Therefore, a need exists for PE articles having equivalent or higher gloss levels than those of the gloss levels of PP, PET, and PVC articles. The PE articles of the present invention meet this need because they have several desirable physical and processing properties, including relatively high levels of gloss.

SUMMARY OF THE INVENTION

The present invention includes an end use article (i.e., an article of manufacture) and a process for making the same, wherein the end use article has a relatively high gloss and exhibits excellent processability over a wide range of processing conditions. The end use article is formed of glossy polyethylene having an "a" parameter less than or equal to about 0.40. Metallocene polyethylene is a glossy polyethylene useful with the present invention. The end use article can have a 60° specular gloss of at least about 40%, or from about 40% to about 80%, or even from about 60% to about 80%. The end use article may be pigmented or unpigmented.

According to another embodiment of the present invention, the end use article is formed of glossy PE (e.g., metallocene PE) and one or more suitable polymers other than glossy PE (e.g., non-metallocene PE). Such other polymers may be blended with the glossy PE, or alternatively co-extruded into separate layers within the article. Non-metallocene PE, i.e., polyethylene formed without using a metallocene PE, can be used with the present invention for blending or co-extrusion with metallocene PE. Non-metallocene PE useful with the present invention include those formed using a known Ziegler-Natta or chromium catalyst.

The article of manufacture of the present invention may be formed by extruding the glossy PE resin or blends thereof into a monolayer bottle. Alternatively, the glossy PE resin may be co-extruded with another polyolefin to form a multi-layered bottle. The glossy PE resin may also be formed, for example by blow molding or extrusion, into other types of articles such as sheet (monolayer or coextruded), a container, a cup, a tray, a pallet, a toy, a film, and a pipe.

BRIEF DESCRIPTION OF THE DRAWINGS

For a detailed understanding and better appreciation of the present invention, reference should be made to the following detailed description of the invention and the preferred embodiments, taken in conjunction with the accompanying drawings, wherein.

DETAILED DESCRIPTION OF INVENTION

Figure 1:
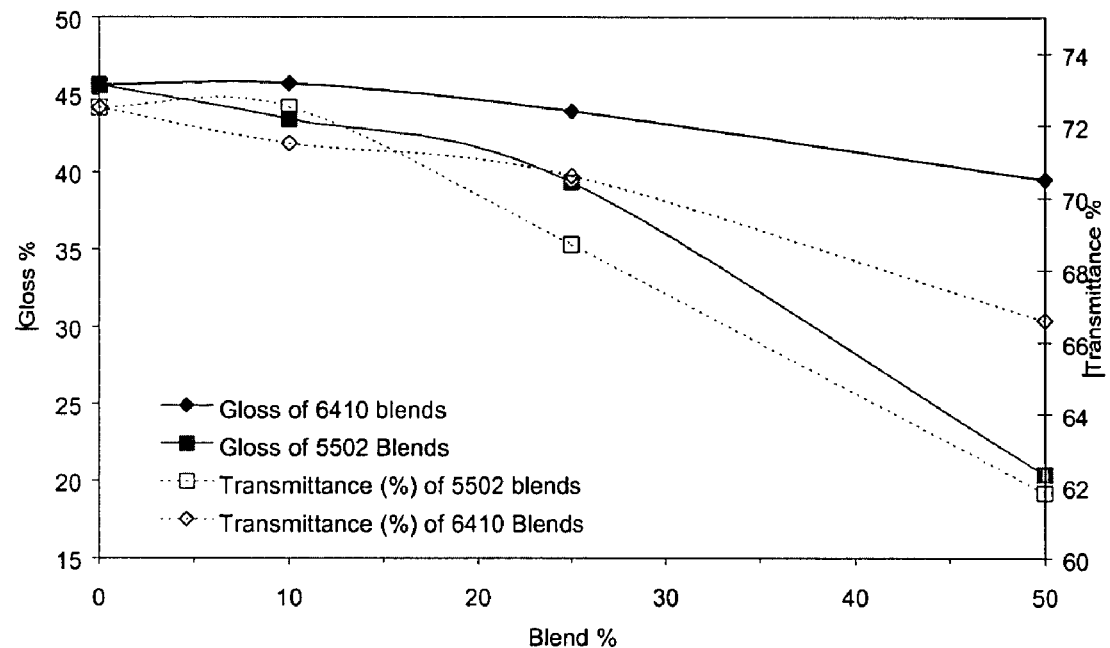
FIG. 1 is a graph depicting gloss and transmittance values for bottles formed using metallocene polyethylene blended with non-metallocene polyethylene.

According to the present invention, an end use article is formed of a glossy polyethylene having a density of from about 0.920 to about 0.965 g/cc; weight average molecular weight of from about 30,000 to about 200,000; a MI2 melt flow rate of from about 0.1 to about 20 dg/min with a 2.16 Kg load at 190° C.; and weight average molecular weight distribution (MWD) in the range of from about 2 to about 6, or from about 2 to about 5, or in the range of from about 2 to 4. Generally, the MWD is defined by a parameter known as the polydispersity index (D), which is the ratio between the weight average molecular weight (Mw) and the number average molecular weight (Mn), i.e., D=Mw/Mn. The polydispersity index (D) can be considered a measure of the width of the molecular weight distribution. Without being limited by theory, it is believed that because the MWD of the glossy PE is narrow, the end use article formed therefrom will have a relatively high level of gloss.

The glossy PE can be processed on conventional extrusion/molding equipment and has excellent processing characteristics. For example, the glossy PE has relatively high melt strength, i.e., the strength of the article in its molten state. Melt strength can be correlated to rheological data fitted with the Carreau-Yasuda model. In particular, melt strength is inversely proportional to rheological breadth, which is also known as the "a" parameter. A lower "a" parameter denotes a higher melt strength. Rheological breadth refers to the breadth of the transition region between Newtonian and power-law type shear rate or the frequency dependence of the viscosity. The rheological breadth is a function of the relaxation time distribution of a polymer resin, which in turn is a function of the resin molecular structure or architecture. Assuming the Cox-Merz rule, the rheological breadth may be calculated by fitting flow curves generated in linear-viscoelastic dynamic oscillatory frequency sweep experiments with a modified Carreau-Yasuda (CY) model, which is represented by the following equation:

$$\eta = \eta_o[1 + (\lambda \dot{\gamma})^a]^{\frac{n-1}{a}}$$

where
$\eta$=viscosity (Pa·s)
$\dot{\gamma}$=shear rate (1/s)
a=rheological breadth [describes the breadth of the transition region between Newtonian and power law behavior]
$\lambda$=relaxation time sec [describes the location in time of the transition region]
$\eta_o$=zero shear viscosity (Pa·s) [defines the Newtonian plateau]
n=power law constant [defines the final slope of the high shear rate region]

To facilitate model fitting, the power law constant is held at a constant value. Experiments were carried out using a parallel plate geometry and strains within the linear viscoelastic regime over a frequency range of 0.1 to 316.2 sec$^{-1}$. Frequency sweeps were performed at three temperatures (170° C., 200° C. and 230° C.) and the data was shifted to form a master curve at 190° C. using known time-temperature superposition methods.

For resins with no differences in levels of long chain branching (LCB), it has been observed that the rheological breadth parameter (a) is inversely proportional to the breadth of the molecular weight distribution. Similarly, for samples which have no differences in the molecular weight distribution, the breadth parameter (a) has been found to be inversely proportional to the level of long chain branching. An increase in the rheological breadth of a resin is therefore seen as a decrease in the breadth parameter (a) value for that resin. This correlation is a consequence of the changes in the relaxation time distribution accompanying those changes in molecular architecture.

In some embodiments of the present invention, the glossy PE article has an "a" parameter of less than about 0.40, or from about 0.10 to 0.40, or from about 0.10 to about 0.20. This relatively low "a" parameter indicates that the glossy PE article has relatively high melt strength.

Another good processing characteristic possessed by the glossy PE is a relatively high onset of melt fracture (OSMF), i.e., the shear rate at which melt fracture first begins. The OSMF varies depending on the particular type of equipment being used to measure the OSMF. Typically, OSMF provides a comparative result or ranking rather than an absolute value. That is, OSMF data is provided for a given glossy PE at given processing conditions as compared to one or more control polymers at the same conditions, as shown in Example 6. High OSMF values indicate that the metallocene polyethylene can be extruded at a high production rate without undergoing melt fracture, which is a surface defect in the end use article that can form during extrusion.

In an embodiment, the glossy polyethylene includes a metallocene polyethylene, which is herein defined as polyethylene formed by polymerizing ethylene in the presence of a metallocene catalyst, examples of such being described in more detail below. In embodiments of the present invention, the metallocene polyethylene can have the physical properties and processing characteristics as described herein. A metallocene PE useful with the present invention is Finacene® BM 359 SG, which is commercially available from ATOFINA Petrochemicals, Inc., the physical properties of which are provided in Example 1.

Glossy end use article are produced according to the present invention. In particular, the resulting end use article can have a 60° specular gloss of at least about 40%, or in the range of from about 40% to about 80%, or in the range of from about 60% to about 80%. Accordingly, the gloss level of the glossy PE article is higher than that of other PE articles and comparable that of conventionally higher gloss resins such as PP, PVC, and PET. The glossy PE article also exhibits other desirable properties, e.g., good contact clarity, good impact strength, and high environmental stress crack resistance (ESCR).

Glossy end use articles produced according to the present invention may be pigmented or unpigmented. In an embodiment of the present invention, the end use article is a substantially translucent article formed of glossy PE and having no pigments. In another embodiment of the invention, the end use article is formed with one or more pigments in addition to the glossy PE. Any suitable polymer pigment that is compatible with the polymer resin as known to those of skill in the art may be used in an amount effective to provide the desired coloration without adversely impacting the remaining physical properties of the article, including desired gloss. The pigments may be combined with the glossy PE resin prior to (e.g., during pelletization) or during processing of the resin into the end use article (e.g., by extrusion).

The non-pigmented and pigmented end use articles described above may contain a single monolayer of glossy PE such that they are glossy in appearance. The single monolayer may be of glossy PE or may be a blend of glossy PE with one or more additional polymers as described herein. The monolayer of glossy PE may or may not contain pigment, depending on its desired appearance. Where an end use article having a higher stiffness is required (for example to support high top loads), the end use article may include one more additional layers co-extruded with an outer layer of glossy PE. The additional layers may contain any suitable polymer, e.g., high density polyethylene (HDPE), medium density polyethylene (MDPE), low density polyethylene (LDPE), linear low density polyethylene (LLDPE), polypropylene, random copolymer polypropylene, syndiotactic polypropylene, terpolymers, etc., for increasing the stiffness of the end use article. The outer layer of glossy PE gives the end use article a glossy appearance while the inner layers improve the stiffness of the article. The different layers of the multi-layered end use article may or may not contain pigment, depending on the desired appearance of the end use article.

In yet another embodiment of the present invention, an end use article is formed with a glossy PE resin blended with one or more additional polymer resins. Any polymer resin suitable for blending with a glossy PE, and particualrly a metallocene PE, may be used in an amount that provides effective end use properties of the article while maintaining the desired level of gloss. For example, metallocene PE may be blended with one or more additional polymers to lower the overall cost of the polymer used in an article or to impart specific end use properties to the article such as stiffness, impact resistance, etc. Examples of suitable polymers for blending with glossy PE include HDPE homopolymer, HDPE copolymers (butene, hexane, octane, etc.), MDPE, syndiotactic PP, etc. Such additional polymers can be blended in an amount less than about 75% by weight based on the weight of the blend, or less than about 50% by weight, or less than about 30% by weight. Metallocene polyethylene (as glossy PE) can be blended with non-metallocene polyethylenes. Examples of suitable non-metallocene PE resins include Ziegler-Natta PE (i.e., PE formed using a known Ziegler-Natta catalyst) and chromium-based PE (i.e., PE formed using a known chromium-based catalyst). Suitable Zeigler-Natta PE useful with the present invention can have the following physical properties: density greater than about 0.930, or greater than about 0.940, or greater than about 0.950 g/cc and MI2 melt flow less than less than about 50 dg/min, or less than about 20 dg/min, and or less than about 5 dg/min. A Ziegler-Natta PE useful with the present invention is commercially available from Atofina Petrochemicals, Inc. under the trademark Finathene® 6410. Suitable chromium-based PE can have the following physical properties: density greater than about 0.930, or greater than about 0.940, or greater than about 0.950 g/cc; and MI2 melt flow less than less than about 5 dg/min, or less than about 2 dg/min, or less than about 1 dg/min. A chromium-based PE useful with the present invention is commercially available from Atofina Petrochemicals, Inc. under the trademark Finathene® 5502. These different PE resins can be dry blended and subsequently compounded together at a temperature above the melting points of the PE resins but below a temperature at which substantial degradation of the PE resins occurs, followed by forming the resulting blend into an end use article (e.g., by extrusion or blow molding). Combining glossy PE (e.g., metallocene PE) and non-metallocene PE in this manner improves the stiffness of the end use article without adversely affecting the gloss and clarity of the end use article. Further, it avoids the need to use expensive co-extrusion equipment to achieve a higher stiffness for the end use article.

If desired, other suitable additives as known to those of skill in the art may be added to the polymer blends. Non-limiting examples of such additives include antiblocking agents, antistatic agents, antioxidants, blowing agents, crystallization aids, dyes, flame retardants, fillers, impact modifiers, mold release agents, oils, other polymers, pigments, processing agents, reinforcing agents, stabilizers, UV resistance agents, and the like. When used, such additives are typically present in the range from about 0.01 to about 50 weight percent of the blend, or in the range of from about 1 to about 25 weight percent of the blend, or in the range of from about 1 to about 10 weight percent of the blend.

In an embodiment of the present invention, the end use article is formed with a metallocene PE combined with up to about 50% by weight of the Ziegler-Natta PE such that the article has a very high 60° specular gloss in the range of about 39% to about 46%. This end use article also has a relatively high transmittance of from about 66% to about 73%. Further, it can handle a maximum top load of from about 69 $lb_f$ to about 101 $lb_f$. Alternatively, the end use article is formed using a metallocene PE combined with up to about 50% by weight of the chromium-based PE such that the article has a high 60° specular gloss in the range of about 20% to about 46%. This end use article also has a relatively high transmittance of from about 61% to about 73% and can handle a maximum top load of from about 69 $lb_f$ to about 97 $lb_f$.

According to an embodiment of the present invention, a process for forming a glossy PE article includes polymerizing ethylene in the presence of a metallocene catalyst to produce a metallocene PE resin, followed by forming the metallocene PE resin into an end use article. In one such embodiment, the polymerization process is performed in a slurry loop reactor in which ethylene and an α-olefin co-monomer (if used) are circulating in the liquid phase. Hexene is often used as the α-olefin co-monomer although other comonomers are equally suitable such as propylene, butene, pentene, 2-methylpentene, octane, etc. A metallocene catalyst and an inert solvent are introduced to the loop reactor, which is maintained at a temperature below the melting point of metallocene PE to ensure that the polymer is formed in the solid state. The active sites on the catalyst are equally accessible to the ethylene throughout the catalyst particle. As such, the polymer chain grows not only outwards but also inwards, causing the granule to expand progressively. The resulting slurry contains medium density PE and metallocene catalyst particles. The slurry is circulated through the loop at a relatively high velocity to prevent it from depositing on the walls of the reactor.

The polymerization reaction conditions, such as temperature, pressure, and reaction time, are optimized to achieve the desired properties for the resulting metallocene PE resin, such as the desired molecular weight, MWD, and density. The slurry, which contains the metallocene PE, is continuously removed from the reactor. The solvent is recovered by hot flashing, and the metallocene PE resin is dried before being subjected to further processing.

In alternative embodiments, the polymerization process is carried out in any suitable reactor for forming metallocene polyethylene, including a stirred tank reactor, a gas phase reactor, a tubular reactor, an autoclave reactor, and combinations thereof. The polymerization process may be performed in a single reactor or in two or more reactors arranged in series.

Any metallocene or mixtures of metallocenes suitable for polymerizing polyethylene homopolymers and/or copolymers may serve as the metallocene catalyst in the polymerization process described above. The metallocene catalyst may be combined with an activator and/or co-catalyst (as described in greater detail below) or the reaction product of an activator and/or co-catalyst, e.g., methylalumoxane (MAO), and optionally an alkylation/scavenging agent, e.g., triethylaluminum (TEAL). Metallocenes are generally characterized as coordination compounds incorporating one or more cyclopentadienyl (Cp) groups (which may be substituted or unsubstituted and may be the same or different) coordinated with a transition metal. The Cp groups may further include substitution by linear, branched, or cyclic hydrocarbyl radicals so as to form other contiguous ring structures, e.g., indenyl, azulenyl, and fluorenyl groups. These additional ring structures may also be substituted or unsubstituted by hydrocarbyl radicals and desirably C1–C20 hydrocarbyl radicals. Various types of supported metallocene catalysts are known in the art. Examples of suitable support materials include talc, an inorganic oxide, clay, clay minerals, ion-exchanged layered compounds, diatomaceous earth, silicates, zeolites, and a resinous support material such as a polyolefin. Specific inorganic oxides include silica and alumina, used alone or in combination with other inorganic oxides such as magnesia, titania, zirconia, and the like.

Non-metallocene transition metal compounds, such as titanium tetrachloride, may also be incorporated into the supported metallocene catalyst.

As used herein unless otherwise indicated, "metallocene" includes a single metallocene composition or two or more metallocene compositions. Metallocenes are typically bulky ligand transition metal compounds generally represented by the formula:

$$[L]_mM[A]_n$$

where L is a bulky ligand, A is a leaving group, M is a transition metal and m and n are such that the total ligand valency corresponds to the transition metal valency.

The ligands L and A may be bridged to each other, and if two ligands L and/or A are present, they may be bridged. The metallocene compound may be full-sandwich compounds having two or more ligands L which may be cyclopentadienyl ligands or cyclopentadiene derived ligands or half-sandwich compounds having one ligand L, which is a cyclopentadienyl ligand or cyclopentadienyl derived ligand. The transition metal atom may be a Group 4, 5, or 6 transition metal and/or a metal from the lanthanide and actinide series. Zirconium, titanium, and hafnium are desirable. Other ligands may be bonded to the transition metal, such as a leaving group, such as but not limited to hydrocarbyl, hydrogen or any other univalent anionic ligand.

The metallocene useful with the present invention can include a bridged metallocene. Such bridged metallocene, for example may, be described by the general formula:

$$RCpCp'MeQn$$

Where Me denotes a transition metal element and Cp and Cp' each denote a cyclopentadienyl group, each being the same or different and which can be either substituted or unsubstituted, Q is an alkyl or other hydrocarbyl or a halogen group, n is a number and may be within the range of 1–3 and R is a structural bridge extending between the cyclopentadienyl rings.

A bridged metallocene is described by the following formula:

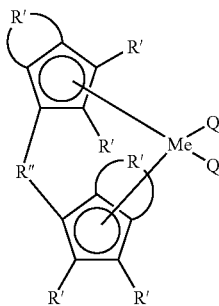

where at least one R'group forms a ring structure having from 1 to 20 carbon atoms on each cyclopentadienyl ring and the remaining R' groups is H or a hydrocarbyl (1–20 carbon atoms), wherein each R' may be the same or different, and where R" is a hydrocarbyl or a Si hydrocarbyl radical.

Examples of metallocene catalysts are disclosed in, among others, U.S. Pat. Nos. 4,794,096; 4,975,403; 4,530,914; 4,542,199; 4,769,910; 4,808,561; 4,871,705; 4,933,403; 4,937,299; 5,017,714; 5,026,798; 5,057,475; 5,120,867; 5,132,381; 5,155,180; 5,198,401; 5,278,119; 5,304,614; 5,324,800; 5,350,723; 5,391,790; 5,436,305; 5,510,502; 5,145,819; 5,243,001; 5,239,022; 5,329,033; 5,296,434; 5,276,208; 5,672,668; 5,304,614; 5,374,752; 5,510,502; 4,931,417; 5,532,396; 5,543,373; 5,846,896; 6,100,214; 6,228,795; 6,124,230; 6,114,479; 6,117,955; 6,087,291; 6,140,432; 6,245,706; 6,194,341; and EP 549 900; 576 970; and 611 773; and WO 97/32906; 98/014585; 98/22486; and 00/12565, each of which is incorporated by reference herein in its entirety.

Metallocenes may be used in combination with some form of activator in order to create an active catalyst system. The term "activator" is defined herein to be any compound or component, or combination of compounds or components, capable of enhancing the ability of one or more metallocenes to polymerize olefins to polyolefins. Alkylalumoxanes such as methylalumoxane (MAO) are commonly used as metallocene activators. Generally alkylalumoxanes contain about 5 to 40 of the repeating units and may be described by the general formulas:

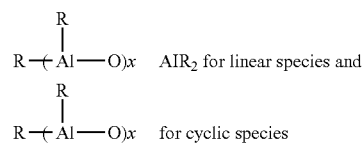

$R-(Al-O)x$ $AlR_2$ for linear species and $R-(Al-O)x$ for cyclic species where R is a $C_1$–$C_8$ alkyl including mixed alkyls. Particularly desirable are the compounds in which R is methyl. Alumoxane solutions, particularly methylalumoxane solutions, may be obtained from commercial vendors as solutions having various concentrations. There are a variety of methods for preparing alumoxane, non-limiting examples of which are described in U.S. Pat. Nos. 4,665,208, 4,952,540, 5,091,352, 5,206,199, 5,204,419, 4,874,734, 4,924,018,4,908,463, 4,968,827, 5,308,815, 5,329,032, 5,248,801, 5,235,081, 5,103,031 and EP-A-0 561 476, EP 0 279 586, EP-A-0 594 218 and WO 94/10180, each of which is incorporated herein by reference.

Ionizing activators may also be used to activate metallocenes. These activators are neutral or ionic, or are compounds such as tri(n-butyl)ammonium tetrakis(pentafluorophenyl)borate, which ionize the neutral metallocene compound. Such ionizing compounds may contain an active proton, or some other cation associated with, but not coordinated or only loosely coordinated to, the remaining ion of the ionizing compound. Combinations of activators may also be used, for example, alumoxane and ionizing activators in combinations. Suitable ionic activators are disclosed in, for example, WO 94/07928, EP-A-0 277 003, EP-A-0 277 004, U.S. Pat. No. 5,198,401, WO-A-92/00333, EP-A-0 426 637, EP-A-0 573 403, EP-A-0 520 732, EP-A-0 495 375, EP-A-0 500 944, EP-AI-0 570, U.S. Pat. No. 5,643,847,U.S. patent application Ser. No. 09,184,358, filed Nov. 2, 1998 and U.S. patent application Ser. No. 09,184,389, filed Nov. 2, 1998, all fully incorporated herein by reference.

Glossy PE such as metallocene PE useful in the present invention typically is provided in the form of pellets or fluff, which may be dry blended (e.g., tumble blended) with pellets or fluff of other suitable polymers as described herein. Apparatus suitable for blending the resins include a Henschel blender or a Banbury mixer, or alternatively low shear blending equipment of the type that typically accompanies a commercial blow molding or sheet extrusion line. The glossy PE resin and blends thereof are typically mechanically compounded or sheared into a molten polymer blend and subsequently subjected to any suitable method for converting such resins into an end use article. Apparatus suitable for compounding the resins include but are not limited to blow molding equipment by Bekum, Uniloy, Graham, etc. and sheet extrusion equipment by Welex and Davis Standard. For example, blow molding may be employed to form the glossy PE resin into a bottle that may be used for a variety of purposes, such as for storing hair care products, shampoos, lotions, powders, dental products, antiperspirants, manicure products, facial cleaners, and pharmaceuticals. Alternatively, the glossy PE resin may be extruded into a sheet (at least about 20 mm thick), which is then thermoformed into an end use article such as a container, a cup, a tray, a pallet, a toy, and a component of another product, etc. Also, flat die extrusion could be used to shape the glossy PE resin into a film (less than about 20 mm thick) used for packaging, and profile extrusion could be used to shape the glossy PE resin into a pipe. It is also possible that the glossy PE could be subjected to injection molding. All of the above methods for forming the end use article are known in the art.

As described previously, the glossy PE and blends thereof may be extruded into a monolayer to form an end use article having a high gloss, good contact clarity, good impact strength, high environmental stress crack resistance (ESCR), and high flexibility such that the end use article is squeezable. Alternatively, the glossy PE or blends thereof may be co-extruded with another polymer, e.g., a HDPE resin having hexene as a comonomer (or any other suitable comonomer), to form a multi-layered end use article. The glossy PE and blends thereof form a high gloss outer layer of the end use article, which can make up about 10–15% of the entire thickness of the article. A suitable HDPE is commercially available from Atofina Petrochemicals, Inc. under the trade name Finathene® 50100 or Finathene® 5502. The multi-layered end use article of the present invention exhibits a high gloss, good contact clarity, high impact strength, high ESCR, and high stiffness. Optionally, the glossy PE such as metallocene PE and blends thereof may be combined with a pigment and/or a non-metallocene PE before extruding the mixture into a monolayer or co-extruding the mixture with another polymer to form a multi-layered end use article. The process conditions for the various article forming techniques, such as pressure, residence time, type of machinery, and the like, may be determined by one skilled in the art of forming thermoplastics. Other ways of forming end use articles of glossy PE and blends thereof known to those skilled in the art are also within the scope of the present invention.

EXAMPLES

The following examples are provided to illustrate the present invention. The examples are not intended to limit the scope of the present invention and they should not be so interpreted. Amounts are in weight parts or weight percentages unless otherwise indicated.

Example 1

A sample of Finacene® BM 359 SG, i.e., a metallocene PE resin, was obtained, and several properties of the Finacene® BM 359 SG were measured. Those properties and the methods used to obtain those properties are provided in Table 1 below:

TABLE 1

| BM 359 SG Resin Properties | Values | ASTM Method |
| --- | --- | --- |
| Melt Flow Index at 190° C. (2.16 kg sample), g/10 min. | 0.9 | D1238 |
| Melt Flow Index at 190° C. (21.6 kg sample), g/10 min. | 25 | D1238 |
| Density, g/cm$^3$ | 0.935 | D792 |
| Melting Point, ° F. | 255 | D3417 |
| 60° Gloss | 40 to 80 | D2457 |
| Tensile Strength at Yield, psi | 4,000 | D638, Type IV Specimen, 2 in/min. |
| Elongation at Break, % | >600 | D638, Type IV Specimen, 2 in/min. |
| Flexural Modulus, psi | 107,000 | D790 |
| Izod Impact at 23° C., ft-lb/in | 10.5 | D256 |
| Cold Temp. Impact at −20° C., ft-lb-in | 23.0 | ASTM D3763 |
| ESCR, hrs. | >1,000 | D1693, Cond B |
| D (Mw/Mn) | 3–4 | Gel Permeation Chromatography |

Example 2

Finacene® BM 359 SG was molded into three bottles using conventional blow mold equipment. The bottles were molded on continuous extrusion blow molding equipment at three different customer sites. The molding conditions were typical for high density polyethylene. Extrusion temperature profile of 350° F. in all zones with a die temperature of 350 to 390° F. The melt temperature range was 360 to 400° F. Mold temperatures were in the range of 45 to 60° F.

Bottles were collected from a retail store for comparison with the metallocene PE bottle. Those bottles were formed from a chromium-based HDPE resin, a Ziegler-Natta HDPE resin, a LDPE (low density polyethylene) resin, a PP resin, a PET resin, and a PVC resin. A sample of each bottle was cut away for use in measuring different properties of the bottles. In particular, the 60° specular gloss values of all of the bottles were measured according to ASTM D2457, and the density and MWD were measured for some of the bottles. The MWD was determined by means of a curve obtained using gel permeation chromatography (GPC). These measurements are shown in Table 2 below:

TABLE 2

| Polymer | Density, g/cm$^3$ | Molecular Weight Distribution as Measured by GPC, Mw/Mn | 60° Specular Gloss, % |
| --- | --- | --- | --- |
| Chromium-based HDPE | 0.955 | 8 | 21.7 |
| Ziegler-Natta HDPE | 0.952 | 6 | 26.8 |
| LDPE | 0.920 | 8 | 38.4 |
| BM 359 SG | 0.935 | 4 | 44.3, 68.2, 74.9 |
| PP | | | 44.9 |
| PET | | | 40.0 |
| PVC | | | 74.6 |

As expected, the density and MWD values decreased as the gloss values increased. The gloss values of the metallocene PE bottles were greater than the gloss values of the chromium-based HDPE bottle, the Ziegler-Natta HDPE bottle, the LDPE bottle, and the PET bottle. Furthermore, the gloss values of the metallocene HDPE bottles were nearer in value to the gloss values of the PP and PVC bottles than were the gloss values of the other HDPE bottles.

Example 3

To determine the processability of Finacene® BM 359 SG, the OSMF and the "a" parameter were measured for samples of the resin. In particular, the OSMF was determined for samples of the Finacene® BM 359 SG and for samples of another metallocene medium density polyethylene resin (a Linear m-MDPE similar to that know as D350 available from ChevronPhillips Chemical Company) produced with a n-butyl metallocene catalyst at two different temperatures using a commercial-scale blow molding machine equipped with three different die designs. The OSMF was determined by measuring the average shear rate (1/seconds) at the die exit at the point when melt fracture was first observed. Table 3 below provides the OSMF values for all of the samples:

TABLE 3

|  | OSMF for BM 359 SG | OSMF for Linear m-MDPE |
| --- | --- | --- |
| Die 0/200° C. | 17814 | 250 |
| Die 0/170° C. | 8634 | 400 |
| Die 2/200° C. | 1700 | 400 |
| Die 2/170° C. | 1700 | 400 |
| Die 7/200° C. | 2028 | 150 |
| Die 7/170° C. | 442 | 150 |

Based on the results shown in Table 3, the Finacene® BM 359 SG exhibited much higher OSMF values than did the linear m-MDPE, with the optimum OSMF values being observed for die 0. As such, the end use articles of the present invention, which contain a metallocene PE resin such as Finacene® BM 359 SG, are less likely to have surface defects caused by melt fracture.

The "a" parameter was determined for samples of Finacene® BM 359 SG and the Linear m-MDPE. The "a" parameters for those samples are shown in Table 4 below:

TABLE 4

|  | "a" parameter |
| --- | --- |
| BM 359 SG | 0.15 |
| Linear m-MDPE | 0.48 |

As shown in Table 4, the "a" parameter for the Finacene® BM 359 SG sample was lower than the "a" parameter for the Linear m-MDPE sample, thus indicating that the melt strength for the Finacene® BM 359 SG sample was higher than the melt strength for the Linear m-MDPE sample.

Example 4

Various blends of a metallocene PE resin and a non-metallocene PE resin were subjected to blow molding to determine whether the stiffness of the resulting bottles could be improved without adversely affecting the gloss and clarity of the bottles. First, several lots of Finacene® BM 359 SG pellets were mixed using a ribbon blender in order to have enough material for experimentation. The Finacene® BM 359 SG pellets were then mixed with different amounts of Finathene® 6410 (Ziegler-Natta PE) pellets having a density of 0.961 g/cc, MI2 melt flow of 1.2 dg/min, and a 5 polydispersity index and with different amounts of Finathene® 5502 pellets (chromium-based PE) having a density of 0.955 g/cc, MI2 melt flow of 0.35 dg/min, and an 8 polydispersity index to form 6 different blends. The compositions of a control sample 1 and of the six different blends (blends 2–7) are provided in Table 5 below:

TABLE 5

| Blend | BM 359 SG, wt. % | 6410, wt. % | 5502, wt. % |
| --- | --- | --- | --- |
| 1 - Control | 100 | 0 | 0 |
| 2 | 90 | 10 | 0 |
| 3 | 75 | 25 | 0 |
| 4 | 50 | 50 | 0 |
| 5 | 90 | 0 | 10 |
| 6 | 75 | 0 | 25 |
| 7 | 50 | 0 | 50 |

The blends were processed on a Bekum blow molding machine at 18 rpm using a temperature profile for extrusion of 350° F. (zone 1)—360° F.—360° F.—360° F.—360° F.—360° F. (die). The same processing conditions were used for all of the blends. The control Finacene® BM 359 SG resin was run first for 3 hours to coat the surfaces of the die and the extruder and to eliminate the melt fracture instability observed during start-up. The extrusion variables recorded during the extrusion were the same for all of the blends (8.5 amperes for the extruder, 5.5–11 amperes for the hydraulic pump, 3–3.3 kW power, 1.125–1.25 melt pressure, 190° C. melt temperature). In order to produce bottles of the same weight (40 grams (g) +/−1 g and 140 g +/−1 g) and thickness, the die gap was adjusted for every blend. With the exception of 50% BM 359 SG/50% 5502 blend, which was difficult to cut on the Bekum, all of the blends produced bottles without problems.

The gloss, transmittance, and maximum top load values were measured for the 40 g bottles on the Bekum. Test samples were cut from a sidewall of each bottle and flattened, and the 60° specular gloss was measured for each according to ASTM D2457. FIG. 1 illustrates the effect of the blend composition on the gloss and transmittance of the bottles. For the BM 359 SG/6410 blends, the gloss (line M) and the transmittance (line P) drop only slightly as the weight percent of the 6410 resin increases from 10% to 25%, and the gloss and transmittance moderately drop as the weight percent of the 6410 resin increases from 50% to 100% (see line M). In contrast, for the BM 359 SG/5502 blends, the gloss (line N) and the transmittance (line 0) moderately drop as the weight percent of the 5502 resin increases from 0% to 25%, and they drastically drop as the weight percent of the 5502 resin increases from 25% to 50% (see line N). Thus, for the BM 359 SG/6410 blends, the weight percent of the 6410 resin can be up to 50%, whereas for the BM 359/5502 blends, the weight percent of the 5502 resin can be up to 25%.

Table 6 below presents the gloss, transmittance, and maximum top load values for the 40 g bottles produced on the Bekum.

TABLE 6

| Blend | Gloss, % | Transmittance, % | Max Linear Load, lb_f Avg. | Max Linear Load, lb_f Std. Dev. | Max Linear Deflection, lb_f Avg. | Max Linear Deflection, lb_f Std. Dev. | Max Load, lb_f Avg. | Max Load, lb_f Std. Dev. | Max Load Deflection, lb_f Avg. | Max Load Deflection, lb_f Std. Dev. |
|---|---|---|---|---|---|---|---|---|---|---|
| 1 | 45.6 | 72.5 | 34.6 | 0.35 | 0.84 | 0.07 | 72 | 3.06 | 2.73 | 0.18 |
| 2 | 45.7 | 71.5 | 35.7 | 2.31 | 0.796 | 0.09 | 76.1 | 3.18 | 2.46 | 0.21 |
| 3 | 43.9 | 70.6 | 42.8 | 6.14 | 0.87 | 0.13 | 89 | 9.90 | 2.496 | 0.29 |
| 4 | 39.5 | 66.6 | 47.6 | 4.99 | 0.802 | 0.10 | 95.2 | 5.75 | 2.44 | 0.25 |
| 5 | 43.4 | 72.5 | 38.2 | 3.74 | 0.81 | 0.16 | 84 | 3.06 | 2.95 | 0.24 |
| 6 | 39.3 | 68.7 | 44.2 | 5.79 | 0.85 | 0.15 | 91.2 | 5.65 | 2.73 | 3.90 |
| 7 | 20.4 | 61.8 | 40.3 | 10.31 | 0.734 | 0.21 | 83.8 | 8.32 | 2.19 | 0.32 |

As shown in Table 6, a BM 359 SG/6410 bottle including up to about 50% by weight of the 6410 resin based on the total weight of the bottle has a 60° specular gloss of from about 39% to about 46%, a transmittance of from about 66% to about 73%, and a maximum top load of from about 69 lb_f to about 101 lb_f. A BM 359 SG/6410 bottle including up to about 25% by weight of the 6410 resin based on the total weight of the bottle has a 60° specular gloss of from about 43% to about 46%, a transmittance of from about 70% to about 73%, and a maximum top load of from about 69 lb_f to about 99 lb_f. A BM 359 SG/6410 bottle including up to about 10% by weight of the 6410 resin based on the total weight of the bottle has a 60° specular gloss of from about 45% to about 46%, a transmittance of from about 71% to about 73%, and a maximum top load of from about 69 lb_f to about 79 lb_f. Further, a BM 359 SG/5502 bottle including up to about 50% by weight of the 5502 resin based on the total weight of the bottle has a 60° specular gloss of from about 20% to about 46%, a transmittance of from about 61% to about 73%, and a maximum top load of from about 69 lb_f to about 97 lb_f. A BM 359 SG/5502 bottle including up to about 25% by weight of the 5502 resin based on the total weight of the bottle has a 60° specular gloss of from about 39% to about 46%, a transmittance of from about 68% to about 73%, and a maximum top load of from about 69 lb_f to about 97 lb_f. A BM 359 SG/5502 bottle including up to about 10% by weight of the 5502 resin based on the total weight of the bottle has a 60° specular gloss of from about 43% to about 46%, a transmittance of from about 72% to about 73%, and a maximum top load of from about 69 lb_f to about 87 lb_f.

Figure 2:
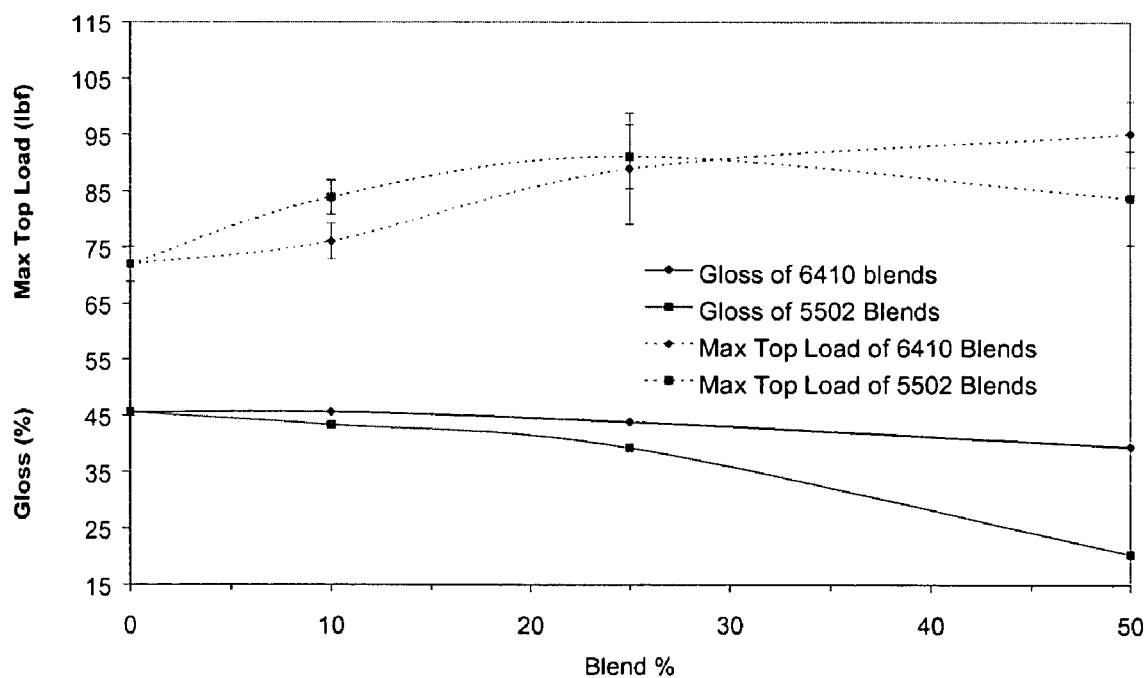
FIG. 2 is a graph depicting maximum top load values and gloss values for bottles formed using metallocene polyethylene blended with non-metallocene polyethylene.

The maximum top load and gloss values were measured for the 140 g bottles produced on the Bekum. FIG. 2 illustrates the effect of the blend composition on the maximum top load and the gloss of the bottles. For the BM 359 SG/6410 blends, the maximum top load (line T) increases significantly as the weight percent of the 6410 resin increases from 0% to 25%, and it moderately decreases as the weight percent of the 6410 resin increases from 25% to 50%. For the BM 359 SG/5502 blends, the maximum top load (line S) moderately increases from 0% to 50%. A 17% gain in compression force (i.e., maximum top load) is achieved by blending the BM 359 SG resin with 25 wt. % of either the 5502 or the 6410 resins. Also, the gloss (Q) of the BM 359 SG/6410 blends drops very little as the weight percent of the 6410 resin increases from 0% to 50%. The gloss of the BM 359 SG/5502 blends drops slightly as the weight percent of the 5502 resin increases from 0% to 25%, and it drops drastically as the weight percent of the 5502 resins increases from 25% to 50%. Thus, additional compression force may be gained by using greater amounts of the 6410 resin at the expense of losing some gloss. On the other hand, larger amounts of the 5502 resin do not improve the maximum compression force.

Example 5

A Finacene® BM 359 SG resin was extruded into a sheet using a Welex sheet extruder. Finathene® 5502 pellets (chromium-based PE) having a density of 0.955 g/cc, MI2 melt flow of 0.35 dg/min, and an 8 polydispersity index was also extruded into a sheet for comparison purposes. The MWD and the 45° specular gloss values per ASTM 2457 of these extruded sheets were measured. The MWD was determined by means of a curve obtained using gel permeation chromatography (GPC). These measurements are shown in Table 7 below:

TABLE 7

| Cap Layer of Co-extruded Sheet | Density, g/cm³ | Molecular Weight Distribution as Measured by GPC, Mw/Mn | 45° Specular Gloss, % |
|---|---|---|---|
| Chromium-based HDPE | 0.955 | 8 | 23 |
| BM 359 SG | 0.935 | 4 | 46 |

As depicted in Table 7, the gloss of the extruded sheet containing the Finacene® BM 359 SG resin was much higher than the gloss of the extruded sheet containing the chromium-based HDPE.

While the preferred embodiments and examples of the invention have been shown and described, modifications thereof can be made by one skilled in the art and still be within the scope of the present invention. Reactor design criteria, pendant polymer processing equipment, and the like for any given implementation of the invention will be readily ascertainable to one of skill in the art based upon the disclosure herein. The embodiments and examples described herein are provided for illustration and are not intended to be limiting. Many variations and modifications of the invention disclosed herein are possible and are within the scope of the invention. Accordingly, the scope of protection is not limited by the description set out above, but is only limited by the claims which follow, that scope including all equivalents of the subject matter of the claims.

What is claimed is:

1. An blow molded article of manufacture comprising polyethylene having an "a" parameter of up to about 0.40 and wherein the blow molded article comprises a 60° specular gloss of at least about 40%.

2. The article of manufacture of claim 1 wherein the "a" parameter ranges from about 0.10 to about 0.40.

3. The article of manufacture of claim 1 wherein the "a" parameter ranges from about 0.10 to about 0.20.

4. The article of manufacture of claim 1 wherein the polyethylene is metallocene polyethylene.

5. The article of manufacture of claim 1, wherein the polyethylene has a molecular weight distribution of from about 2 to about 5.

6. The article of manufacture of claim 2, wherein the polyethylene has a molecular weight distribution of from about 2 to about 5.

7. The article of manufacture of claim 3, wherein the polyethylene has a molecular weight distribution of from about 3 to about 4.

8. The article of manufacture of claim 2 having a 60° specular gloss of from about 40% to about 80%.

9. The article of manufacture of claim 3 having a 60° specular gloss of from about 60% to about 80%.

10. The article of manufacture of claim 1, further comprising one or more pigments combined with the polyethylene.

11. The article of manufacture of claim 8, further comprising one or more pigments combined with the polyethylene.

12. The article of manufacture of claim 9, further comprising one or more pigments combined with the polyethylene.

13. The article of manufacture claim 1 further comprising one or more additional polymer resins.

14. The article of manufacture of claim 1, further comprising up to about 50% by weight of one or more additional polymer resins based on a total weight of the article of manufacture.

15. The article of manufacture of claim 1, further comprising up to about 25% by weight of one or more additional polymer resins based on a total weight of the article of manufacture.

16. The article of manufacture of claim 1, further comprising up to about 10% by weight of one or more additional polymer resins based on a total weight of the article of manufacture.

17. The article of manufacture of claim 13, wherein the polyethylene is in an outer layer and additional polymer resin is in inner layer.

18. The article of manufacture of claim 13 wherein the polyethylene and the additional polymer resin are uniformly blended throughout the article.

19. The article of manufacture of claim 18 where the polyethylene is metallocene polyethylene and the additional polymer resin is a non-metallocene polymer resin.

20. The article of manufacture of claim 4, having an outer layer and an inner layer, wherein the outer layer comprises the metallocene polyethylene and the inner layer consists essentially of one or more polymers other than metallocene polyethylene.

21. The article of manufacture of claim 1, being selected from a group comprising a bottle, a container, a cup, a tray, a pallet, a toy, a film, a sheet, and a pipe.

* * * * *